A. JOHNSON.
Machine for Slitting Lock Nuts.
No. 231,492. Patented Aug. 24, 1880.
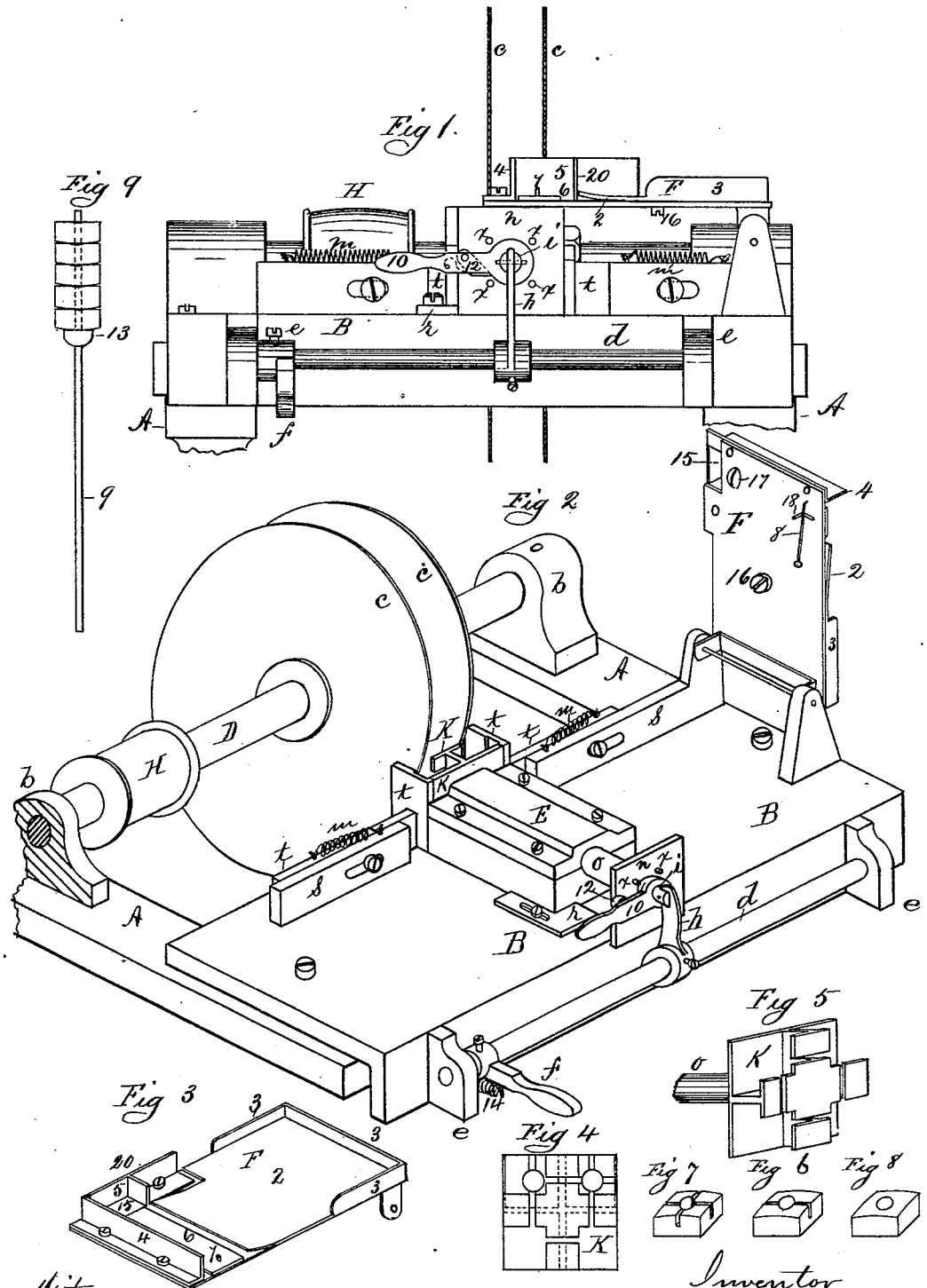

UNITED STATES PATENT OFFICE.

ALONZO JOHNSON, OF SPRINGFIELD, MASSACHUSETTS.

MACHINE FOR SLITTING LOCK-NUTS.

SPECIFICATION forming part of Letters Patent No. 231,492, dated August 24, 1880.

Application filed February 2, 1880.

*To all whom it may concern:*

Be it known that I, ALONZO JOHNSON, of Springfield, county of Hampden, and State of Massachusetts, have invented new and useful Improvements in Machines for Slotting Lock-Nuts, which improvements are fully set forth in the annexed specification and accompanying drawings.

My invention relates to machines used for sawing slots in nuts, for the purpose of causing said nuts to lock themselves onto a bolt when screwed thereon, and is adapted for sawing hot nuts; and my invention consists of a machine constructed with two saws and having a table arranged in front thereof, upon which to lay several nuts at a time, with provision for dropping them one by one into a revolving nut-holder, which can also be moved forward toward the saws and which holds two nuts to be sawed at the same time.

Referring to the drawings, which consist of nine figures, Figure 1 is a front elevation of my machine. Fig. 2 is a perspective view of the front end thereof, showing its operative parts. Fig. 3 is a perspective view of the nut-table. Fig. 4 is an end elevation of the nut-holder, showing a nut in each of its upper receptacles. Fig. 5 is a perspective view of the same. Fig. 6 is a view of a nut once sawed. Fig. 7 is a view of a nut twice sawed. Fig. 8 is a view of a nut before being sawed. Fig. 9 is a view of a handling-rod with a series of nuts thereon, showing the manner of passing the hot nuts from the fire to the table of the machine.

A is the frame of the machine, on which are fixed shaft-bearings $b$, in which runs a shaft, D, carrying two saws, $c$ $c$. H is a driving-pulley on shaft D. B is a table fixed on one end of frame A, before the saws. $d$ is a rock-shaft hung in bearings $e$ on the edge of table B, and provided with a hand-lever, $f$, and an arm, $h$. 14 is a spring. $i$ is a pin hinged to arm $h$, and entering into the outer end of the shaft $o$ to nut-holder K. 10 is a pawl-carrying lever on pin $i$. 12 is a pawl pivoted to lever 10. $n$ is a plate on the outer end of shaft $o$. $x\ x\ x\ x$ are pins in plate $n$. E is a long bearing for shaft $o$. $t\ t$ are slides working on the face of vertical portions $s$ of the table B. $m$ are springs. $r$ is a gage-plate. F is a nut-table hinged to table B. 2 is an auxiliary bottom plate on table F, having one end turned slightly up, as shown, and raised borders 3. 4 and 5 are adjustable nut-guides on table F. 6 is a sliding nut-carrier on table F. 15 is a nut-passage through the bottom of table F. 7 is a pin thereon, and 8 is a spring. 9 is a nut-handling rod, having a fixed collar, 13, thereon.

The saws $c$ $c$ are arranged to be run at a high rate of speed.

The operating position of the parts is such as is shown in Fig. 1, and in Fig. 2 when table F is laid down, as seen in Fig. 1.

Table B is constructed in the form shown, and secured across one end of frame A. Table F is hinged to table B, for convenience in lifting it away from such operating parts as it covers when in a working position. Table B may be made adjustable longitudinally on frame A, so as to be set up toward the saws to compensate for their wear. Said table F is constructed of metal, and has attached adjustably to it an auxiliary bottom, 2, provided with raised borders 3, having one end slightly turned up, as shown, and secured to the table by a screw, 16, which passes through an elongated hole therein. Arranged to slide on table F is a nut-carrier, 6, secured thereto by a screw, 17, passing through an elongated hole in the bottom; and projecting down from said carrier, through a slot in the bottom, is a pin, 18, against which a spring, 8, presses, as seen in Fig. 2, and on the top face thereof is set a pin, 7.

On one end of table F, parallel to nut-carrier 6, is secured by screws, as shown, a raised nut-guide, 4, adjustable to and from the edge of said carrier. On the back side of the table F, opposite the end of carrier 6, is secured by a screw, as shown, a second nut-guide, 5, which is adjustable longitudinally on the table, and said guide 5 is provided with a projecting wing, 20. Three sides of the opening 15 in table F are partially surrounded by the sides 4 and 5 and wing 20, the table there being cut away to provide a nut-passage, 15, through it.

Arranged upon the table B, across it, in box E, in front of saws $c$ $c$, as seen in Fig. 2, is a nut-holder, K, provided with a shaft, $o$, and a plate, $n$, having fixed therein a series of pins, $x$. The holder K and said plate $n$ are fixed upon either end of shaft $o$, and said holder is constructed with four partially-inclosed nut-pockets on its face, as seen in Fig. 5.

In the outer end of shaft $o$ is secured a center pin, $i$, carrying on it a freely-swinging hand-lever, 10, provided with a pawl, 12, pivoted to its side next to plate $n$. The end of pin $i$ is slotted, as shown, and pinned into said slot is the upper end of an arm, $h$, attached to a rock-shaft, $d$. To said rock-shaft, which turns in bearings on table B, is secured a hand-lever, $f$, and a spring, 14, is attached to the under side of said lever and to the table. Fixed adjustably on table B, back of plate $n$, on shaft $o$, is a gage-plate, $r$.

On each side of nut-holder K, and arranged to slide longitudinally on table B and press against the vertical sides of said holder, drawn by springs $m$, are two slides, $t$, with broad heads, as shown.

It has not been customary heretofore to arrange nut and bolt machines for the reception thereon of more than one hot blank or piece at a time; but the economical rapid accomplishment of this class of work makes it desirable that many pieces should be handled at once. Hence the novel arrangement of my receiving-table F and nut-holder; also, the nut-handling rod is constructed with a collar, 13, thereon, and having such a length between the collar and one end as will accommodate such a number of nuts as it is desirable to place at one time on the table of the machine to be sawed.

It is obvious that the construction of the nut-holder K, whereby it is arranged to hold and present to the saws two hot nuts at a time to have two successive cuts made in each one in rapid succession, demands such an arrangement of the nut-receiving table and devices for feeding nuts to the holder as provide for the reception thereon and the rapid handling of a number of hot nuts at one time; therefore my table F is constructed, as described, with provision for receiving such a quantity of hot nuts upon it as enables the operator to keep the saws constantly at work. To this end my table is arranged to have placed upon it a quantity of nuts, which can be bodily passed onto a nut-feeding slide, so that a line of hot nuts may lie in such a position on the table before or over the nut-holder as is demanded for the rapid successive feeding of them before they shall have time to cool.

The nut-receptacles on the face of holder K are constructed with reference to the size of the nuts which are to be sawed.

The operation of my machine is as follows, viz: The adjustment of the parts of the machine to saw nuts properly and to a desired depth of slot is accomplished as follows: The depth of the slot is determined by the extent of the forward movement of nut-holder K toward the saws, and said movement is governed by the position of the gage-plate $r$ on table B, one end of which extends behind plate $n$ on shaft $o$, and when the latter slides back the bottom edge of plate $n$ strikes the edge of plate $r$ and is stopped at that point. Plate $r$ is adjustable toward and from the edge of the table B, as shown.

To adjust table F so that nuts falling from it through passage 15 into the nut-holder K will be properly directed, the nut-guides 4 and 5 are set nearer to or farther from said passage 15.

The nuts to be sawed are heated red hot, and removed from the fire by means of the rod 9, whose collar 13 is set at such a point thereon, nearer to one end, as will leave only sufficient room beyond it to put onto it the number of nuts required in each series for the table, as seen in Fig. 9, and transferred to table F, and laid thereon in the order seen in Fig. 9, a little to the right of the turned-up end of the auxiliary bottom 2. The nuts having been so placed, the rod is withdrawn from them, and they are all moved together up over the turned-up edge of the plate 2 onto the sliding nut-carrier 6, up against the guide-plate 4. The end of the bottom 2 is turned up, as shown, so as to lift the nuts up over the edge of slide 6 as they are pushed from the table onto it. The operator now pushes against the nut nearest to him, and the whole series slide forward, pushing the one nearest the saws over the passage or opening 15 and against the guide-plate 5. At this point the nut which is over this opening is prevented from surely falling through it by being more or less bound between the nuts behind it and the side of plate 5; but its bottom edge is moved beyond the end of slide 6, and the rest of the nuts rest thereon. Therefore, to free the nut over said opening and allow it to freely drop into the nut-holder below, slide 6 is, by the application of any convenient hook to pin 7 thereon, drawn back from said opening, drawing any nuts that may be on it away from the one over the opening, leaving it free to drop into the holder. This brings a nut into the holder and before the saw nearest the table F.

The next operation is to lift up the end of hand-lever $f$, moving rock-shaft $d$ and arm $h$, and thus causing shaft $o$ and its immediately-connected parts to move toward the saws and crowd the aforesaid nut in holder K against one of them, and thus sawing a slot in the nut, when the nut is drawn back by a contrary movement of lever $f$ and the aforesaid feeding devices.

Plate $n$ is made square, as shown, so that when the nut-holder is moved toward the saws said plate is carried over the top of table B, and while in this position the operator cannot by mistake turn shaft $o$ while a nut is in contact with the saw and injure the latter. The operator then lifts up lever 10, causing the pawl 12 thereon to engage with one of pins $x$ in plate $n$, and brings said lever down again in a direction to revolve shaft $o$ and the nut-holder one-quarter round. As the nut-holder turns over two of its corners press against the heads of slides $t$, driving them back from it; but immediately that the holder has turned one-quarter round springs $m$ cause said slides to reassume their places against the sides of the holder, keeping the nut just sawed in its proper compartment therein. After the nut-holder has been so revolved another nut is fed into the holder, as first described, and the holder is moved again toward the saws, carrying two nuts this time instead of one; but the nut first sawed is carried over by the holder, so as to bring it in front of the second saw, and it is also presented to said saw, turned one-quarter over on its own axis, so that the cutting-line of said second saw will intersect the line of the first-cut slot at right angles and centrally across the face of the nut. The operator next moves the nut-holder forward again, as before described, this time bringing a nut against each saw, and sawing two slots at once, one in each nut. The next rotary movement of the nut-holder to receive a nut from the table carries the aforesaid twice-sawed nut over and drops it under the machine. Thus the aforesaid operations are successively performed until the said hot nuts which were placed on the table have been all sawed.

If it should be desirable to employ my machine for sawing nuts requiring but one slot it can be conveniently used for that purpose by arranging lever 10 so that it will revolve the nut-holder in a direction opposite to that required when two slots are to be sawed.

What I claim as my invention is—

1. In a nut-sawing machine, the combination, with the saws $c\ c$, of the nut-holder K, provided with the nut-pockets, as shown, and means, substantially as described, for rotating and moving it reciprocatingly before said saws, substantially as and for the purpose set forth.

2. The combination, with the nut-holder K, provided with pockets, as shown, of the slides $t$, substantially as and for the purpose set forth.

3. The combination, with the nut-holder K, provided with pockets, as shown, of the saws $c\ c$ and slides $t$, substantially as and for the purpose set forth.

4. The combination, with the table F, provided with the nut-passage 15, of the sliding nut-carrier 6, substantially as and for the purpose set forth.

5. The combination, with shaft $o$, nut-holder K, and table B, of the plate $n$, secured to said shaft, substantially as and for the purpose set forth.

ALONZO JOHNSON.

In presence of—
H. A. CHAPIN,
WM. H. CHAPIN.